United States Patent [19]

Halfhill

[11] 3,826,927

[45] July 30, 1974

[54] SMOOTH WAVE ELECTRICAL GENERATOR

[75] Inventor: Martin O. Halfhill, San Jose, Calif.

[73] Assignee: Information Storage Systems, Inc., Cupertino, Calif.

[22] Filed: May 21, 1970

[21] Appl. No.: 39,385

[52] U.S. Cl. .................. 307/263, 307/227, 307/228, 328/142, 328/184, 328/185, 328/186

[51] Int. Cl. .............................................. H03k 4/08

[58] Field of Search ........... 307/227, 228, 229, 230, 307/260, 263, 264; 328/142, 143, 144, 145, 176, 184, 185, 186, 209

[56] References Cited

UNITED STATES PATENTS

| | | | |
|---|---|---|---|
| 3,128,377 | 4/1964 | Goddard | 328/145 X |
| 3,188,455 | 6/1965 | Quick, Jr. | 307/229 X |
| 3,364,366 | 1/1968 | Dryden | 307/229 X |
| 3,408,580 | 10/1968 | Moriyasu | 328/185 |
| 3,436,559 | 4/1969 | Wajs | 328/142 X |
| 3,448,289 | 6/1969 | Harris | 307/230 |

*Primary Examiner*—Donald D. Forrer
*Assistant Examiner*—R. C. Woodbridge
*Attorney, Agent, or Firm*—Gerald L. Moore; Robert B. Crouch

[57] ABSTRACT

A wave generator for use in such apparatus as a disc file equipment control to provide a smooth wave having a predetermined configuration. The wave is generated by the use of an amplifier having a first feedback circuit for providing a stepped incremental signal with the value of the increments being responsive to the input signal of the amplifier. A second feedback circuit is provided for supplying to the amplifier input a signal which is the integral of the amplifier output and with a polarity opposite to that of the first feedback signal. In this manner, the incremental signal is smoothed to provide an output signal tangential to the bottom of each step of the incremental signal.

5 Claims, 3 Drawing Figures

INVENTOR.
MARTIN O. HALFHILL
BY Gerald L. Moore
ATTORNEY

SMOOTH WAVE ELECTRICAL GENERATOR

BACKGROUND OF THE INVENTION

FIELD OF THE INVENTION

The present invention relates to the production of electrical wave signals of suitable form for any desired purpose. The primary object of the present invention is to generate a smooth wave form by the use of standard electrical circuit components.

A further object of this invention is to generate a smooth wave form which closely approximates a predetermined incremental wave form and intersects the coordinate axes at the place of intersection of the incremental wave form.

Still a further object of this invention is to generate a smooth wave form by means of apparatus which is relatively drift free and self-compensating for variances in the operation of the components thereof.

SUMMARY OF THE INVENTION

The smooth wave generator utilizes an amplifier having a first feedback circuit for providing an incremental feedback signal responsive in magnitude to the output of the amplifier and having a second feedback signal means supplying a signal responsive to the integral of the original output signal of the amplifier. The second feedback means is reset at each incremental change of the first feedback means to eliminate drifting from the amplifier output signal.

DESCRIPTION OF A PREFERRED EMBODIMENT

Figure 1:
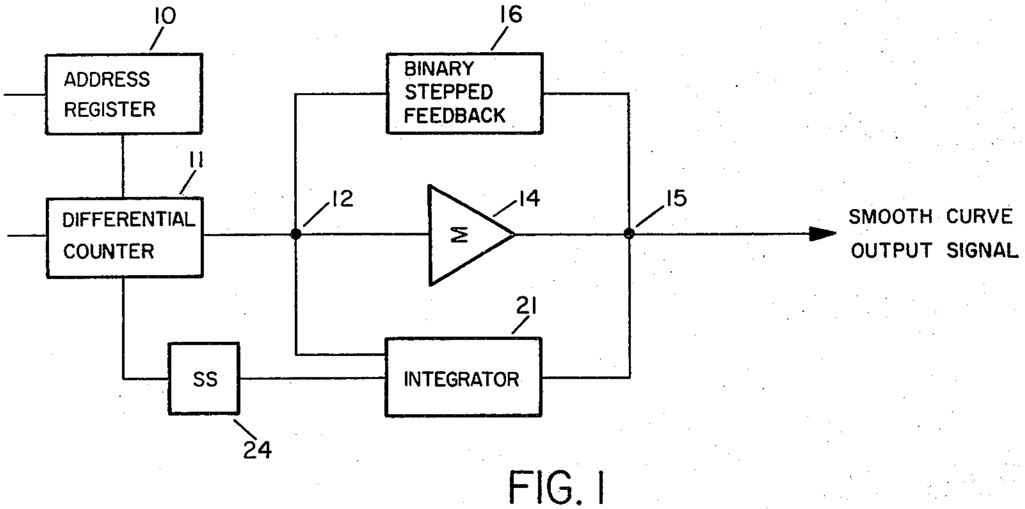
FIG. 1 is a block diagram showing the primary components of the invention.

In FIG. 1 is shown a wave generator embodying the subject invention but consisting of some standard electrical components utilized in the past. In this example, the invention is utilized for the generation of a specific wave form to be fed to the actuator in a disc file apparatus used for storing data in a computer system. While it should be understood that the invention can be applied to other systems with equally beneficial results, still there exists in such an apparatus the need to supply a voltage wave form to the head actuator for the specific purpose of decelerating the actuator as it approaches the address or position desired. To control the actuator, the position to which it is desired to be moved is fed into an address register 10 which supplies to a differential counter 11 a signal indicative of that position. The differential counter compares that signal with one responsive to the present position of the head to generate a differential signal indicating the distance to move the head. The differential signal is in the form of a binary weighted input signal which is fed through the juncture 12 to an amplifier 14. Responsive to that signal, the amplifier generates an output signal at the juncture 15 to which is connected a first feedback circuit 16.

The purpose of the feedback circuit 16 is to provide a signal which modifies the input signal to the amplifier 14 by incremental amounts responsive to the amplitude of the amplifier output signal. By controlling the values of the incremental stages of the feedback signal, substantially any output wave form can be approximated with the single feedback circuitry. The feedback signal varies by incremental or stepped amounts because discreet components are included and switched into the feedback circuitry for shaping the output curves at the juncture 15.

Figure 3:
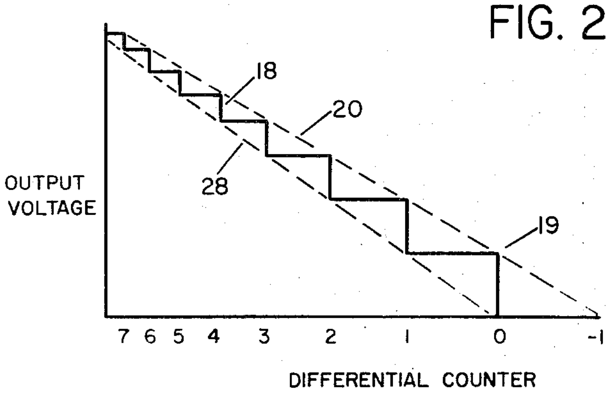
FIG. 3 shows an example of a wave form that can be generated by the subject invention.

In FIG. 3 is shown a typical curve generated in the manner shown. In this graph, the abscissa axis indicates the differential count corresponding to the input signal received from the differential counter 11 in units indicating spaces between the present position and the desired position of the actuator. The ordinate axis is scaled to indicate the output signal voltage at the juncture 15. Thus, the curve 18 of incremental steps is generated by a change in level of the feedback signal supplied through the first feedback circuit 16. In this instance the feedback signal is subtracted from the amplifier output signal to generate a staircase-shaped wave form. The binary steps are caused by the introduction of incremental components affecting the level of the feedback signal as will be explained in more detail later. The successful usage of such a stepped signal in a control system, however, is difficult because the incremental variations make precise positioning of any actuator difficult. Thus, it is desirable to smooth the wave form in a manner to eliminate the incremental variations in the signal.

While particular problems are encountered in utilizing such a stepped curve, specific difficulty is encountered as the curve approaches the zero position on the differential count scale. For instance, when point 19 is approached, the curve still indicates a voltage of substantial amount while in actuality, the actuator is near the zero position and a zero voltage signal should be indicated. To overcome some of the difficulties caused by the stepped increments, attempts have been made to smooth out the wave by the generation of a curve 20 tangential to the high points of the staircase wave form. The smoothing of the wave form has generally been accomplished by providing separate feedback signals which are amplified in such a way as to provide the smoothing effect. Such circuits also generally utilize separate amplifier components in the feedback circuitry which components are susceptible to drifting or changing in operation to the extent that the smooth curve many times only approximates the staircase curve. With sufficient change in the feedback characteristics of the circuitry, the signal will actually depart substantially from the original curve desired. The same problems are encountered as with the incremental wave form as point 19 is approached, since if the smooth curve 20 is followed, there actually will be an overrun by the actuator to a point one position beyond that desired. Accordingly, additional circuitry must have been added in such prior art devices to fool the actuator as it approaches the ultimate position so that it is, in fact, stopped before the position indicated by the smoothed curve. Of course, the addition of such circuitry complicates the control.

In accordance with the present invention, there is provided means for smoothing the wave form 20 shown in FIG. 3 along a line tangential to the bottom of the incremental steps of the curve so that as the zero position is approached, the smoothed curve actually represents the desired signal necessary for controlling the actuator. Additionally, the curve is generated in a manner to limit to a minimum degree any drifting of the smoothed curve from the staircase curve so as to make the approximate curve more accurate and functional in providing the wave form desired. To accomplish this, there is provided a second feedback circuit supplying to the input of the amplifier a signal responsive to the integral of the original amplifier output signal generated in the circuitry heretofore described, which signal is of opposite polarity from that of the first feedback means so as to subtract therefrom and make the final signal generated by the circuit tangential to the bottom portions of the staircase curve. In this manner, the smoothed curve closely approximates the actual wave form desired. Additionally, the integrator is reset at each intersection with the staircase curve to limit any drifting from the original incremental curve and render the final output signal more accurate. By the elimination of any amplification means within the second feedback circuit itself, further accuracy is provided in approximating the curve actually desired.

Figure 2:
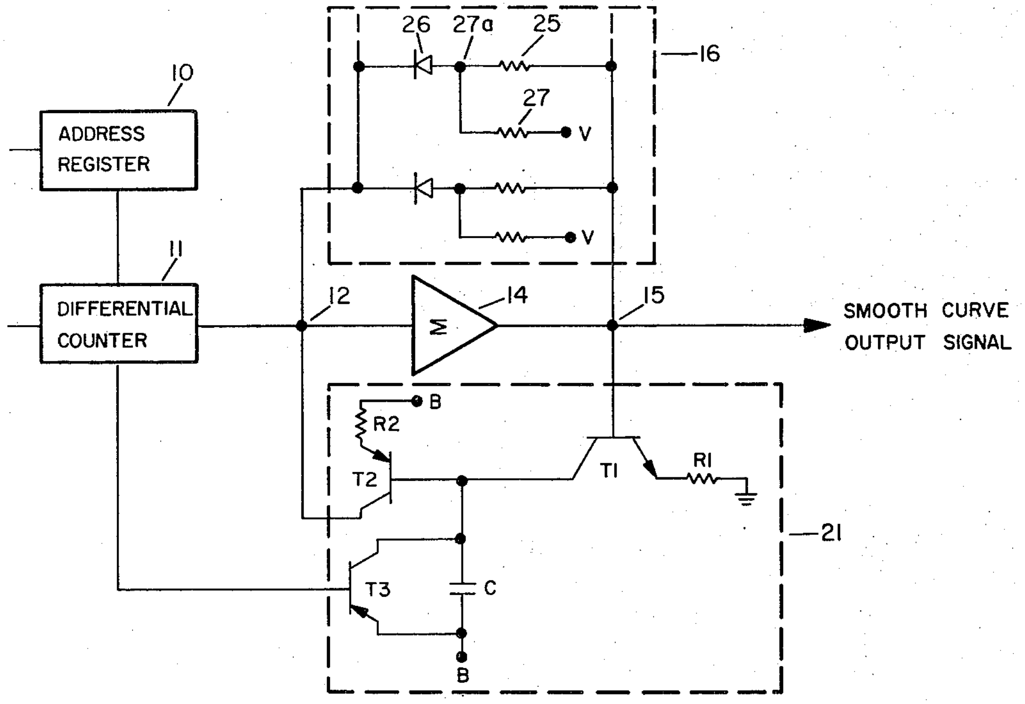
FIG. 2 is a detailed schematic of the invention.

Accordingly, as shown in FIG. 1, an integrator 21 receives a signal from the juncture 15 for supplying to the juncture 12 an integrated signal which, when added to the amplifier input signal, results in the smooth curve generated as described. In FIG. 2 is shown a schematic of the invention, comprising the differential counter 11, the amplifier 14, the first feedback circuit 16, the integrator circuit 21 and a single shot 24. As shown, the first feedback means 16 comprises a series of circuits including resistors 25 and diodes 26 with resistors 27 connected to the juncture between each resistor 25 and diode 26 and being supplied at the other terminal with a predetermined voltage V. As the amplifier output voltage reaches a level which, when combined with the voltage at the juncture 27a, equals the breakdown voltage for the diode, conduction will be initiated and continue through the resistor 25 and the diode 26 to result in a change in the amplitude of the feedback signal. In this manner, each incremental step of the output wave form 18 (FIG. 3) is generated. Naturally, there can be as many individual diode circuits as are needed to generate the staircase signal desired.

The integrator 21 comprises a transistor T1, which is turned on by the amplifier output signal, thereby permitting a capacitor C to be charged from a voltage source B. The rate of charge of this capacitor is controlled by the resistor R1. During this period of time, the transistor T3 is non-conductive. As the capacitor C becomes charged, the transistor T2 is turned on because of an increase of the base voltage thereof, thereby permitting conduction from the voltage source B through the resistor R2 to the transistor input at juncture 12. In this manner, an integrated signal is added to the input signal for the amplifier to provide the smooth amplifier output signal 28. By the selection of the proper polarity of the voltage source B to be opposite to that of the signal V supplied through the first feedback circuit, the feedback signals are subtractive thereby making the smoothed curve tangential to the minimum points of the staircase curve.

As the counted 11 changes the output signal value, a pulse is generated which is transmitted to the single shot 24. With energization of the single shot, the transistor T3 is rendered conductive to supply a discharge path for the capacitor C. In this manner, the smooth wave form 28 ultimately generated by the invention always intersects the staircase wave form at the lower points of the vertical steps. Therefore, drifting of the smooth curve from the staircase curve is prevented since the smooth curve is reset at each increment of the staircase curve to a value equal to that of the incremental curve. Additionally, it will be noted that the smooth curve intersects the ordinate at the same point as the staircase curve, thereby making the control of any actuator or other device more precise and negating the need for additional circuitry to overcome the difficulties encountered in previous inventions as described heretofore.

I claim as my invention:

1. A wave generator for generating a smooth wave from an input signal comprising:

an amplifier having an input for receiving said input signal and an output for providing an output signal;

a first feedback circuit connecting said amplifier output to said amplifier input, said first feedback circuit comprising means for generating an incremental wave first feedback signal with the value of the increments being responsive to said amplifier input signal; and a second feedback circuit connecting said amplifier output to said amplifier input, said second feedback circuit comprising means for receiving said amplifier output signal and for supplying to said amplifier input a second feedback signal responsive to the integral of said amplifier output signal but of opposite polarity from said first feedback signal, thereby serving to smooth said amplifier output signal for the elimination of abrupt changes in said amplifier output signal.

2. The wave generator of claim 1 wherein said first feedback circuit generates a stepped incremental signal.

3. The wave generator of claim 2 wherein said second feedback circuit comprises means for resetting the value of said second feedback signal at each incremental change of said first feedback signal, thereby preventing drifting of said second feedback signal from said amplifier output signal.

4. The wave generator of claim 3 wherein said second feedback circuit comprises a capacitor and capacitor charging means for generating said integral of said amplifier output signal.

5. The wave generator of claim 4 comprising means for discharging said capacitor at each incremental change in said first feedback signal to reset said second feedback signal.

* * * * *